United States Patent
Salter et al.

(10) Patent No.: US 10,773,648 B2
(45) Date of Patent: Sep. 15, 2020

(54) SYSTEMS AND METHODS FOR VEHICLE SIDE MIRROR CONTROL

(71) Applicant: Ford Global Technologies, LLC, Dearborn, MI (US)

(72) Inventors: Stuart C. Salter, White Lake, MI (US); Paul Kenneth Dellock, Northville, MI (US); Erick Michael Lavoie, Dearborn, MI (US); Keith Hoelscher, Northville, MI (US); Pietro Buttolo, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 15/703,733

(22) Filed: Sep. 13, 2017

(65) Prior Publication Data

US 2019/0077315 A1 Mar. 14, 2019

(51) Int. Cl.
 *B60R 1/02* (2006.01)
 *B60R 1/062* (2006.01)
 *B60R 1/078* (2006.01)

(52) U.S. Cl.
 CPC .............. *B60R 1/025* (2013.01); *B60R 1/062* (2013.01); *B60R 1/078* (2013.01)

(58) Field of Classification Search
 CPC ........... B60R 1/025; B60R 1/062; B60R 1/07; G06K 9/00791; B60D 1/62; B60D 1/06
 See application file for complete search history.

(56) References Cited

U.S. PATENT DOCUMENTS

| | | | | |
|---|---|---|---|---|
| 5,912,616 A | * | 6/1999 | Valentino | B62D 53/0871 280/432 |
| 7,114,817 B2 | | 10/2006 | Evans et al. | |
| 7,287,867 B2 | | 10/2007 | Wellington et al. | |
| 2009/0080096 A1 | * | 3/2009 | Fimeri | B60R 1/07 359/841 |
| 2013/0163877 A1 | * | 6/2013 | Morishita | G06K 9/00268 382/190 |
| 2014/0063245 A1 | * | 3/2014 | Bowers | B60R 1/0607 348/148 |
| 2014/0092495 A1 | * | 4/2014 | Bowers | B60R 1/06 359/841 |
| 2015/0131176 A1 | * | 5/2015 | Soh | B60R 1/025 359/843 |

(Continued)

FOREIGN PATENT DOCUMENTS

| | | |
|---|---|---|
| DE | 10019002 A1 | 10/2001 |
| DE | 102007057751 A1 | 6/2009 |
| DE | 10155913 B4 | 3/2010 |

*Primary Examiner* — Jennifer D. Carruth
(74) *Attorney, Agent, or Firm* — David Coppiellie; Carlson, Gaskey & Olds

(57) ABSTRACT

Method and apparatus are disclosed for controlling one or more side mirrors of a vehicle. An example vehicle includes a trailer sensor, brake sensor, and speed sensor, a side mirror, and a processor. The processor is configured to set the side mirror in a first position responsive to determining via the trailer sensor and speed sensor that a trailer is attached, and that a vehicle speed is above a threshold speed. And the processor is further configured to transition the side mirror to a second position responsive to determining that vehicle brakes have been applied for a threshold duration.

17 Claims, 4 Drawing Sheets

(56) References Cited

U.S. PATENT DOCUMENTS

| | | | |
|---|---|---|---|
| 2015/0360615 A1* | 12/2015 | Peterson | B60R 1/078 359/841 |
| 2017/0140228 A1* | 5/2017 | Lang | G08G 1/167 |
| 2018/0024562 A1* | 1/2018 | Bellaiche | G01S 19/48 701/26 |

* cited by examiner

SYSTEMS AND METHODS FOR VEHICLE SIDE MIRROR CONTROL

TECHNICAL FIELD

The present disclosure generally relates to vehicle side mirrors and, more specifically, systems and method for side mirror control under various circumstances.

BACKGROUND

Many vehicles may include the ability to attach a trailer or other device to a rear of the vehicle, such that the vehicle may tow the trailer. The addition of the trailer can make it more difficult to maneuver the vehicle, and can cause particular difficulty when parking or driving in tight or narrow road conditions.

Vehicles may also include one or more sensors that can enable the vehicle systems to capture information about the vehicle and surroundings, to allow the vehicle to be driven in a safer and more efficient manner. These sensors may assist with improving gas mileage and enabling the driver to better view the vehicle surroundings, for example.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for controlling one or more side mirrors of a vehicle. An example disclosed vehicle includes a trailer sensor, brake sensor, and speed sensor, a side mirror, and a processor. The processor is configured to set the side mirror in a first position responsive to determining via the trailer sensor and speed sensor that a trailer is attached, and that a vehicle speed is above a threshold speed. The processor is also configured to transition the side mirror to a second position responsive to determining that vehicle brakes have been applied for a threshold duration.

An example disclosed method includes determining, by a vehicle processor, that a trailer is attached. The method also includes determining, by the vehicle processor, that a vehicle speed is above a threshold speed. The method further includes responsively setting a side mirror in a first position. The method still further includes determining that vehicle brakes have been applied for a threshold duration. And the method yet further includes responsively transition the side mirror to a second position.

A third example may include means for determining that a trailer is attached to a vehicle. The example also includes means for determining that the vehicle speed is above a threshold speed. The example further includes means for responsively setting a side mirror in a first position. The example still further includes means for determining that vehicle brakes have been applied for a threshold duration. And the example yet further includes means for responsively transitioning the side mirror to a second position.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
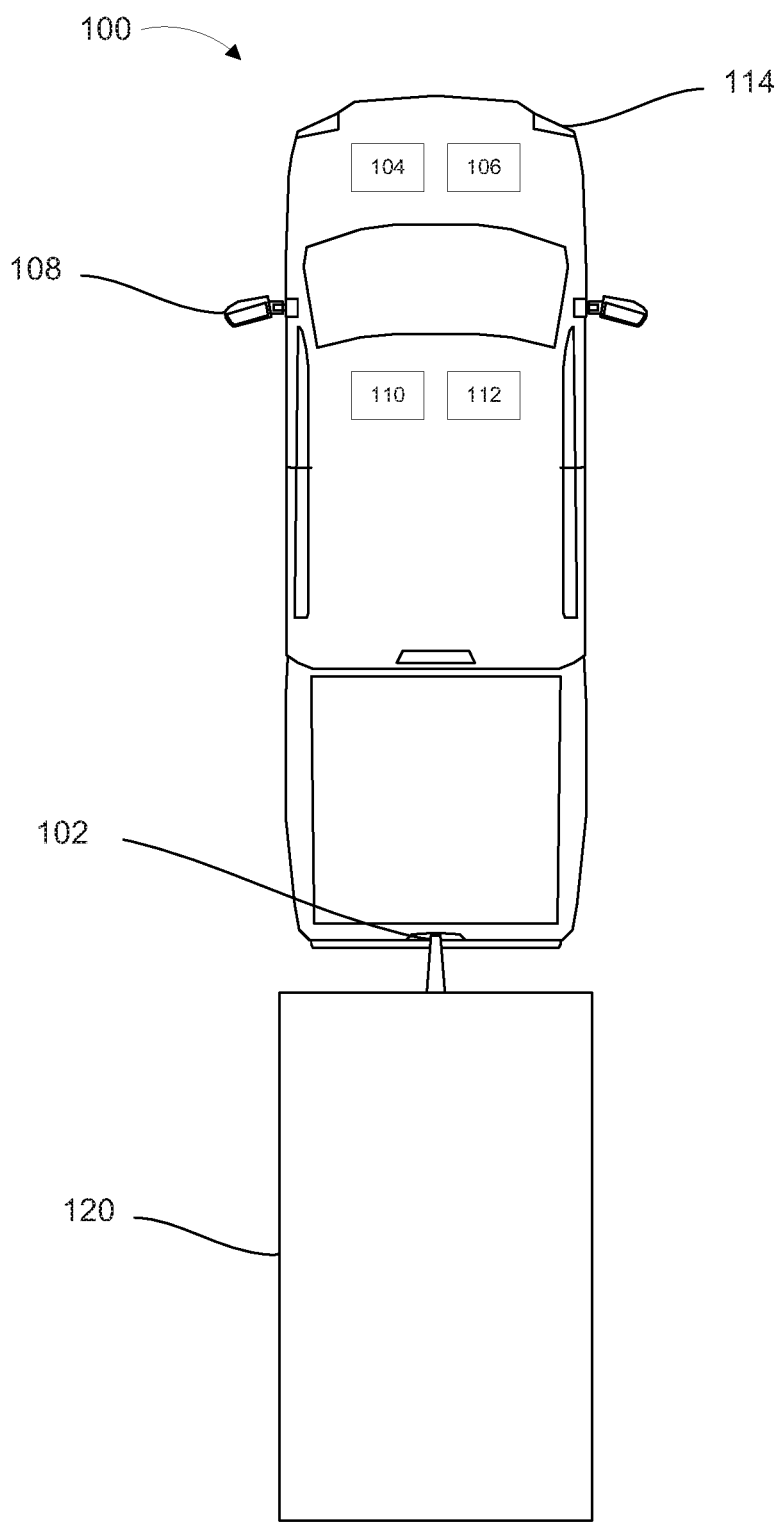
FIG. 1 illustrates a vehicle and trailer according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include the ability to attach a trailer behind the vehicle, such that the trailer can be towed as the vehicle moves. The trailer may include a camper, boat, storage device, or other movable object. When a trailer is present and attached to the vehicle, the driver's view may be blocked, which can cause safety concerns. This is especially true during parking maneuvers, turning maneuvers, and movement in tight spaces or where there are narrow road conditions.

In order to provide the driver with a greater field of view, some embodiments may include extending the side mirrors of the vehicle laterally outward. This may provide the driver with an increased viewing angle, and can allow the driver to more easily see objects and complete driving maneuvers, especially when a trailer is attached to the vehicle.

Extended side mirrors, however, can create a large drag force while the vehicle is moving which may reduce fuel or energy efficiency of the vehicle. With this problem in mind, examples disclosed herein may provide systems and method for controlling the extension and retraction of vehicle side mirrors under varying circumstances, to increase the energy efficiency of the vehicle. Control of the side mirrors may be based on data received from a trailer sensor, speed sensor, brake sensor, turn signal, and one or more other systems or devices of the vehicle. The data may be received and analyzed to determine one or more characteristics of the vehicle (e.g., is the vehicle travelling above a threshold speed) which in turn can be used to control the side mirrors to either extend outward from the vehicle to provide a greater driver viewing angle, or to retract toward the vehicle to reduce drag and improve the vehicle energy efficiency.

In one example, a vehicle may include a trailer sensor, a brake sensor, a speed sensor, and one or more side mirrors (e.g., left and right side mirrors). The vehicle may also include a processor, configured to set the mirror(s) in a first position responsive to determining via the trailer sensor that a trailer is attached to the vehicle, and via the speed sensor that the vehicle speed is above a threshold speed. For instance, where the vehicle has a trailer attached and is traveling above 15 miles per hour, the side mirror(s) may be set in the retracted position.

In the example, the processor may then be configured to extend the side mirror(s) to a second position responsive to determining that the brakes have been applied for a threshold duration. For instance, the threshold duration may be as short as 1 second. When the brakes are applied for one second, the mirror(s) may be extended to provide the driver with a greater field of view.

In the example, the processor may then be configured to determine that the brakes have been released (such as via the brake sensor), wait a predetermined amount of time, and then responsively set or return the side mirror(s) to the first position. In other words, this example may include the vehicle travelling along at a high speed, and the driver may press the brakes. In response, the side mirrors may extend to the second position, to allow the driver a better view. The driver may then release the brakes, to continue on his or her journey. After a period of time, the mirrors may automatically retract again to the first position, to improve the vehicle energy efficiency. This process may be repeated each time the brakes are pressed. Other examples, embodiments, and variations are discussed below.

FIG. 1 illustrates and example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a trailer sensor 102, brake sensor 104, speed sensor 106, side mirrors 108, a processor 110, a traffic sensor 112, and a turn signal 114. Also shown in FIG. 1, vehicle 100 is coupled to a trailer 120. Vehicle 100 may also include one or more additional electronic components, described in further detail with respect to FIG. 2.

Trailer sensor 102 may be configured to detect whether a trailer is attached or not attached to vehicle 100. In some examples, trailer sensor may detect a change in capacitance between an unattached trailer (i.e., a trailer hitch with no trailer on it) and an attached trailer. The difference in capacitance may be used to detect the presence of a trailer coupled to vehicle 100.

Where a trailer is not attached, the side mirrors 108 may be set or maintained in a first, compact, position for better fuel economy. This may be due to the fact that a vehicle 100 without a trailer may not need an extended side view mirror in order to provide the driver with a full view behind the vehicle.

Where there is a trailer attached, as in FIG. 1, one or more systems or device of vehicle 100 may provide addition information to processor 110 in order to determine whether to set the side mirrors in the second, extended, position.

Brake sensor 104 in FIG. 1 may be configured to determine one or more metrics associated with braking actions of vehicle 100. For instance, brake sensor may measure the occurrence of a braking action (i.e., brake on or brake off), a duration of the braking action, an intensity of the braking action, and more.

In some examples, brake sensor 104 may be configured to determine a number of braking actions over a given period of time. For instance, a number of braking actions per minute. This number may be compared to a threshold, and when the threshold is met, one or more actions may be taken. The actions may include modifying a threshold braking duration, modifying one or more aspects or characteristics of the side mirrors 108, or modifying one or more vehicle systems, for example.

Speed sensor 106 may be configured to determine a speed at which vehicle 100 is moving. In some examples processor 110 may set a threshold speed, below which the side mirrors 108 may extend and above which the side mirrors 108 may retract. Other factors may impact whether or not the side mirrors 108 expand or retract. For instance, in some cases the side mirrors 108 may extend when the vehicle is moving above the threshold speed, and/or retract when the vehicle is moving below the threshold speed. The threshold may be a baseline speed at which one or more other determinations are made with respect to the side mirrors 108.

Side mirrors 108 may be any type of mirror that provides a driver with a view looking backward from the front of vehicle 100. FIG. 100 shows two side mirrors 108, one on the left side and one on the right side.

Figure 3A:
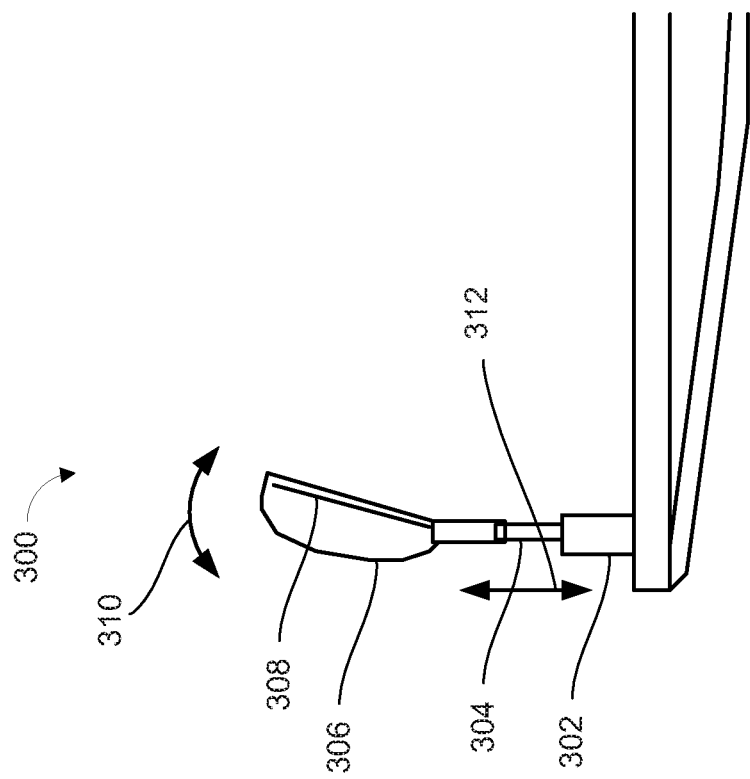
FIGS. 3A and 3B illustrate overhead perspective views of an example side mirror in a first state and a second state according to embodiments of the present disclosure.
Figure 3B:
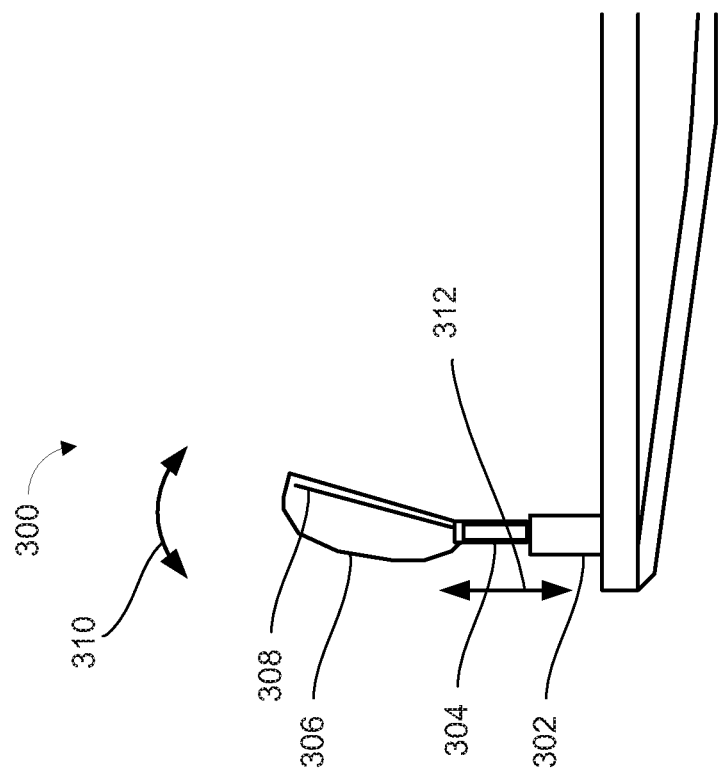

Side mirrors 108 may be configured to extend in and out laterally from vehicle 100, shown in greater detail in FIGS. 3A and 3B. This may be accomplished through the use of one or more actuators, pistons, or other movable elements. The side mirrors may be in a first position, which may be compact and close to the vehicle 100. This may allow for less drag while vehicle 100 is moving, thus improving the fuel efficiency or energy efficiency of vehicle 100. The side mirrors may also be in a second position, extended away laterally from vehicle 100. The second position may provide the driver with greater visibility.

In some examples, side mirrors 108 may also include one or more other characteristics in addition to the position (compact or extended), such as a mirror yaw, pitch, or other angle. The mirror angles may be set and modified by one or more actuators.

One or more mirror characteristics, such as mirror angle, may correspond to the first or second position. For instance, a side mirror in the first, contracted, position may correspond to a first mirror angle, while second, extended, position may correspond to a second mirror angle. This may enable the driver to have the best view, regardless of how far the mirror is extended away from vehicle 100. Further, it may allow for drivers of differing heights to adjust the mirror angles to provide appropriate views.

In some examples, one or more characteristics of the side mirrors 108, and the amount of extension corresponding to the first position and second position may be set by driver using a user interface of vehicle 100. Setting various characteristics and extension amounts may be done while vehicle is in drive, to allow the system to be operated in an intuitive manner. The driver may be in gear and about to attempt a particular maneuver, such as parking the vehicle. In this scenario, the driver may adjust the mirrors to provide an appropriate viewing angle specific to the driver and the particular maneuver. The adjustment to the mirror characteristics, extension, etc. may be stored and remembered, so it may be used for future parking maneuvers. Other examples are possible as well.

In some examples, rather than or in addition to allowing modifications while the vehicle is in drive, the vehicle may enter a teaching or learning mode, in which the driver may input one or more modifications to the mirror characteristics associated with the first and/or second position. Other techniques to allow user modifications are possible as well.

In some examples, a transition from one position to another may include transitioning one or more mirror characteristics as well. For instance, this may include changing one or more mirror angles in addition to the lateral extension from the first position to the second position.

Processor 110 may be configured to carry out one or more actions described herein, such as receiving data from one or more sensors and responsively controlling the side mirrors.

In some examples, the processor 110 may determine that there is a trailer attached, and that the vehicle is travelling above a threshold speed, and responsively set mirror in a first position. This may be done by receiving data from the trailer sensor 102 and speed sensor 106. Further, processor 110 may determine that the vehicle brakes have been activated for a threshold duration, and responsively transition the side mirrors 108 to a second position.

The threshold duration may be any amount of time, such as 1 second, 5 seconds, shorter than 1 second, or longer than 5 seconds. In addition, the threshold duration may be tied to a determination that the vehicle is entering a sustained braking period (i.e., more than simply a tap of the brakes). As such, the threshold duration may be predetermined, may be dynamically determined or set, and/or may be set by a user of vehicle 100.

Processor 110 may also determine that the vehicle brakes have been applied greater than a threshold number of times in a threshold time period. This may be, for example, greater than five times in thirty seconds. Based on this determination, processor 110 may responsively modify the threshold duration (e.g., from one second to five seconds).

In some examples, a threshold number of brake taps or brake events in a given time period may be required prior to setting the side mirror in the second position. For instance, a vehicle travelling above the threshold speed may be allowed one or more brake events before the mirrors are set into the second position. As such, the mirror may be extended only when a particular frequency of brake events reaches a threshold frequency. This may avoid unnecessary transition of the side mirrors 108 when the vehicle is in stop and go traffic, for example.

Processor 110 may also be configured to determine that the vehicle brakes have been released. And after waiting a predetermined period of time, processor 110 may responsively transition the side mirrors 108 to the first position. In practice this series of events may occur when a driver applies the brakes due to a car in front slowing down, causing the driver to apply the brakes and the mirrors to extend to the second position. When the driver then accelerates and continues on, the mirrors may retract back to the first position.

However, in some examples even after the brake has been released, the processor 110 may maintain the side mirror in the second, extended position. This may occur when the vehicle is in heavy traffic, is likely to make frequent stops, or based on other data from one or more sensors. Traffic sensor 112 may be configured to determine whether there is heavy traffic nearby, or another characteristic of a nearby vehicle. In some examples, traffic sensor 112 may be a camera or other visual sensor, a radar, LIDAR, or other sensor configured to detect the presence and/or characteristics of nearby vehicles. In some examples, traffic sensor 112 may include a communication module for transmitting and/or receiving data from one or more remote devices or systems. The received data may include a characteristic of one or more nearby vehicles, such as traffic conditions, route information, upcoming accidents or traffic stoppages, and more. Based on the characteristic and/or received information, processor 110 may set or maintain the side mirror in the second position even after the brake has been released and the threshold period of time has elapsed.

Vehicle 100 may also include one or more turn signals 114. Processor 110 may detect that the turn signal 114 has been activated, indicating the driver is about to enter a turn. In response, the processor 110 may set the side mirror into the second position, to allow the driver to have a greater field of view.

In some examples, processor 110 may determine a side of vehicle 100 corresponding the activated turn signal, for example that the turn signal is a left turn signal. The processor may then extend the corresponding side mirror to the second position, while setting or maintaining the side mirror on the other side of the vehicle in the first position. This may allow the driver to have a better viewing angle on the "inside" side of the turn. As such, each mirror may be set into the first or second position independently from any other side mirror.

Further, in some cases a steering wheel of vehicle 100 may have a corresponding absolute steering wheel angle. Processor 110 may detect the absolute steering wheel angle, and may set or transition one or more of the side mirrors 108 to the second position based on the absolute steering wheel angle.

Figure 2:
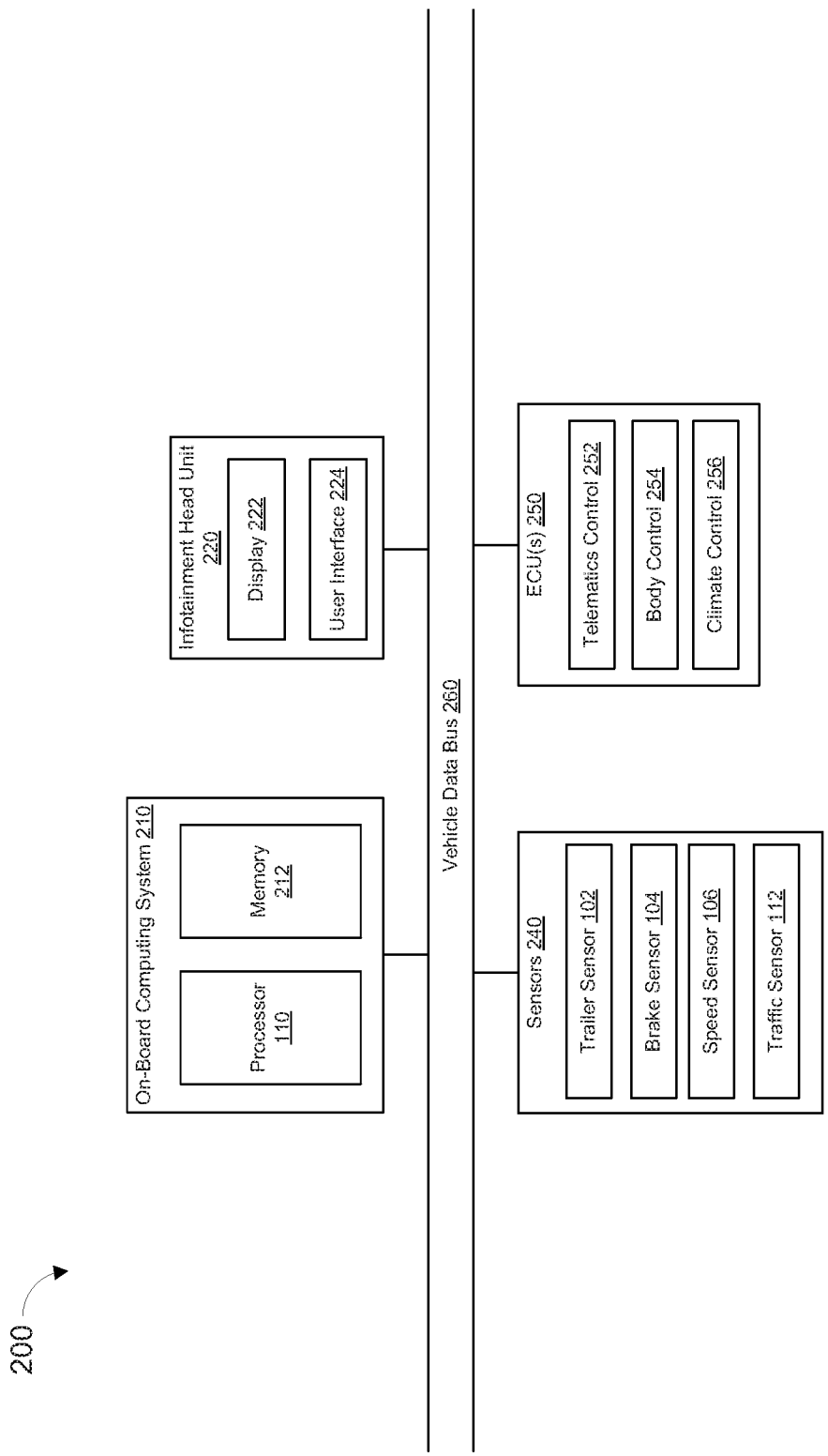
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224. User interface 224 may be an interface for use by a driver or other occupant of vehicle 100, and may include one or more input devices and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display 222 of vehicle 100.

Sensors 240 may be arranged in and around the vehicle 100 in any suitable fashion. In the illustrated example, sensors 240 include trailer sensor 102, brake sensor 104, speed sensor 106, and traffic sensor 112. These sensors are described in greater detail with respect to FIG. 1. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the on-board computing system 210, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

FIGS. 3A and 3B illustrate example overhead perspective views of an example side mirror 300 in a first position (FIG. 3A) and a second position (FIG. 3B).

Side mirror 300 may include a connection element 302 configured to couple the mirror 300 to a door of the vehicle. Side mirror 300 may also include a moveable element 304, configured to extend and allow the mirror to move laterally. FIGS. 3A and 3B illustrate the movable element 304 as a telescoping section, however it should be noted that other types of moveable elements are contemplated as well.

Side mirror 300 also includes an outermost element 306 which houses the mirror 308. The outermost element may rotate or change its angle with respect to the vehicle in direction 310. For instance, the outermost element 306 may rotate along an axis in the direction of arrow 310 to provide the user with a greater or lesser angle when viewed from inside the vehicle. This movement may change the mirror angle.

FIG. 3A illustrates a first position, in which mirror 300 is contracted toward the vehicle. This first position may provide the least drag while the vehicle is in motion, thereby providing the best possible fuel economy. FIG. 3B illustrates the second, extended position. In the second position, the mirror 300 has extended along axis 312 to provide a greater viewing angle for the driver. This second position, however, increased the drag on the vehicle while in motion, thereby decreasing the fuel economy.

Figure 4:
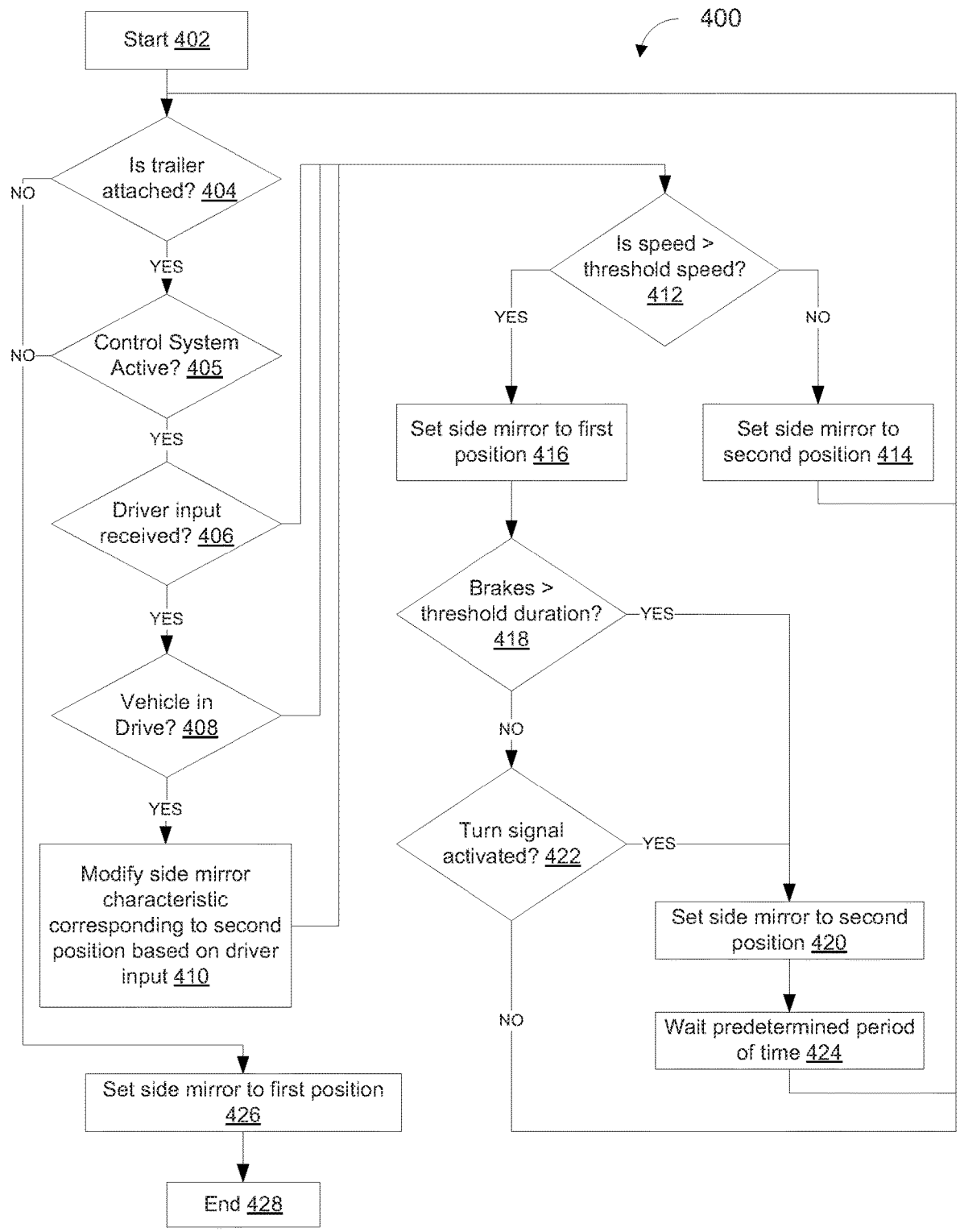
FIG. 4 illustrates a flowchart of an example method according to embodiments of the present disclosure.

FIG. 4 illustrates a flowchart of an example method 400 according to embodiments of the present disclosure. Method 400 may enable a vehicle such as vehicle 100 to control the extension of one or more side mirrors, to provide an improved viewing angle for the driver as well as increased fuel economy. The flowchart of FIG. 4 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-2 and 3A-3B, some functions of those components will not be described in detail below.

Method 400 may start at block 402. At block 404, method 400 may include determining whether a trailer is attached to the vehicle. This may be done via the trailer sensor. Alternatively, this may be done with input from the user via a user interface. If no trailer is attached, method 400 may include setting the side mirror to the first position (compact), at block 426. Method 400 may then end at block 428.

However, if a trailer is determined to be attached to the vehicle at block 404, method 400 may include determining whether the control system is active at block 405. This may include receiving a command from a driver of the vehicle, or automatically determining based on one or more sensors. For instance, the control system may be active any time a trailer is attached, but not active when there is no trailer.

At block 406, method 400 may include determining whether driver input has been received. The driver input may include instructions to modify one or more vehicle settings, such as the amount of extension of the side mirrors, the angle of the side mirrors, and more.

If input is received, method 400 may include determining whether the vehicle is in drive. This may prevent changes to the mirror position and angle while the vehicle is park from being stored and affecting the method in the future. If the vehicle is in drive, method 400 may include modifying a side mirror characteristic corresponding to the second position based on the driver input. This may include changing the amount of extension of the second position of the side mirror, changing an angle of the mirror in the second position, and more.

If no input was received at block 406, or the vehicle is not in drive at block 408, or the modification has been made at block 410, method 400 may proceed to block 412. At block 412, method 400 may include determining whether the vehicle speed is greater than a threshold speed. The threshold speed may be as low as a few miles per hour, or as high as thirty, forty, or more miles per hour. If the vehicle speed is below the threshold, method 400 may include setting the side mirror in the second position at block 414, which may be an extended position.

If the vehicle speed is greater than the threshold speed, method 400 may include setting the side mirror in the first position at block 416. The first position may be a contracted position that reduces drag and improves fuel efficiency.

At block 418, method 400 may include determining whether the brakes have been activated for a threshold duration. The threshold duration may be any amount of time, such as one or two seconds, for example. If the brakes have been activated for the threshold duration, method 400 may include setting the side mirror to the second, extended position. Alternatively, if the brakes have not been activated for the threshold duration, method 400 may include determining whether a turn signal of the vehicle has been activated at block 422. If the turn signal has been activated, method 400 may include setting the side mirror to the second position at block 420.

In some examples, method 400 may further include determining that the vehicle brakes have been activated a threshold number of times in a given time period. For instance, this may include determining that the brakes have been activated for a threshold duration five times in a thirty second time period. This determination may be made instead of or in addition to block 418, and method 400 may include setting the side mirror into the second position responsive to determining that the brakes have been activated the threshold number of times in the given time period.

After the side mirror has been set into the second position at block 420, method 400 may include waiting a predetermined period of time. This may be as low as one second or several seconds, or as high as 30 seconds, a minute, or more. Method 400 may then return to block 404.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a trailer sensor, a brake sensor, and a speed sensor;
   a side mirror; and
   a processor configured to:
      set the side mirror in a first position responsive to determining via the trailer sensor and the speed sensor that a trailer is attached, and that a vehicle speed is above a non-zero threshold speed, respectively; and
      transition the side mirror to a second position responsive to determining via the brake sensor that vehicle brakes have been applied for a non-zero threshold duration,
      wherein the first position is a compact position and the second position is an extended position that is laterally outward of the first position,
      wherein the processor is further configured to determine that the vehicle brakes have been released;
   wherein the vehicle further comprises a traffic sensor configured to determine a characteristic of one or more nearby vehicles, wherein the processor is further configured to:
      set the side mirror in the second position based on the characteristic.

2. The vehicle of claim 1, wherein the processor is further configured to:
   after waiting a predetermined period of time, responsively transition the side mirror to the first position.

3. The vehicle of claim 1, wherein the processor is further configured to determine a side mirror characteristic corresponding to the second position based on input from a driver while the vehicle is in drive.

4. The vehicle of claim 3, wherein the processor is further configured to modify the side mirror characteristic based on a current side mirror position.

5. The vehicle of claim 1, wherein the processor is further configured to:
   detect that a turn signal has been activated; and
   responsively set the side mirror in the second position.

6. The vehicle of claim 5, wherein the side mirror is a first side mirror, the vehicle further comprising a second side mirror, wherein the processor is further configured to set the first side mirror in the second position based on a side of the vehicle corresponding to the turn signal.

7. The vehicle of claim 1, wherein the processor is further configured to:
   detect an absolute steering wheel angle; and
   transition the side mirror to the second position based on the absolute steering wheel angle.

8. A vehicle, comprising:
   a trailer sensor, a brake sensor, and a speed sensor;
   a side mirror; and
   a processor configured to:
      set the side mirror in a first position responsive to determining via the trailer sensor and the speed sensor that a trailer is attached, and that a vehicle speed is above a non-zero threshold speed, respectively; and transition the side mirror to a second position responsive to determining via the brake sensor that vehicle brakes have been applied for a non-zero threshold duration, wherein the processor is further configured to:

determine that the vehicle brakes have been applied greater than a threshold number of times in a threshold time period; and responsively modify the non-zero threshold duration.

9. A method comprising:

determining, by a vehicle processor, that a trailer is attached;

determining, by the vehicle processor, that a vehicle speed is above a non-zero threshold speed;

responsively setting a side mirror in a first position;

determining that vehicle brakes have been applied for a non-zero threshold duration; and responsively transitioning the side mirror to a second position, wherein the first position is a compact position and the second position is an extended position that is laterally outward of the first position;

determining that the vehicle brakes have been released;

determining, by the vehicle processor, a characteristic of one or more nearby vehicles; and setting the side mirror in the second position based on the characteristic.

10. The method of claim 9, further comprising:

after waiting a predetermined period of time, responsively transitioning the side mirror to the first position.

11. The method of claim 9, wherein the method further comprises:

determining a side mirror characteristic corresponding to the second position based on input from a driver while in drive.

12. The method of claim 11, further comprising:

modifying the side mirror characteristic based on a current side mirror position.

13. The method of claim 9, further comprising:

detecting that a turn signal has been activated; and responsively setting the side mirror in the second position.

14. The method of claim 13, wherein the side mirror is a first side mirror of a set comprising the first side mirror and a second side mirror, the method further comprising:

setting the first side mirror in the second position based on a side corresponding to the turn signal.

15. The method of claim 9, further comprising:

detecting an absolute steering wheel angle; and transitioning the side mirror to the second position based on the absolute steering wheel angle.

16. A method, comprising:

determining, by a vehicle processor, that a trailer is attached;

determining, by the vehicle processor, that a vehicle speed is above a non-zero threshold speed;

responsively setting a side mirror in a first position;

determining that vehicle brakes have been applied for a non-zero threshold duration;

responsively transitioning the side mirror to a second position;

determining that the vehicle brakes have been applied greater than a threshold number of times in a threshold time period; and responsively modifying the non-zero threshold duration.

17. The vehicle of claim 1, wherein, in the compact position, an outermost housing element of the side mirror is closer to a door of the vehicle, and in the extended position, the outermost housing element of the side mirror is displaced further away from the door.

* * * * *